(12) United States Patent
Hargarten et al.

(10) Patent No.: US 6,340,717 B1
(45) Date of Patent: Jan. 22, 2002

(54) METHOD FOR PRODUCING FOAMED PLASTIC BLOCKS BASED ON POLYOLEFIN

(75) Inventors: Werner Hargarten, Windeck (DE); Hans Jörg Hartmann, Olten (CH); Burkhard Voss, Pulheim (DE)

(73) Assignees: HT Troplast AG, Troisdorf (DE); Studer Draht-und Kabelwerk, Daniken (CH)

( * ) Notice: Subject to any disclaimer, the term of this patent is extended or adjusted under 35 U.S.C. 154(b) by 0 days.

(21) Appl. No.: 09/719,330

(22) PCT Filed: Jun. 10, 1999

(86) PCT No.: PCT/DE99/01701

§ 371 Date: Feb. 26, 2001

§ 102(e) Date: Feb. 26, 2001

(87) PCT Pub. No.: WO99/64502

PCT Pub. Date: Dec. 16, 1999

(30) Foreign Application Priority Data

Jun. 10, 1998 (DE) .......................... 198 25 939

(51) Int. Cl.$^7$ .................. C08F 2/46; C08J 3/28
(52) U.S. Cl. .................. 522/83; 521/94; 521/142; 521/143; 522/62; 522/65; 522/110; 522/112; 522/114; 522/117; 522/121; 522/157; 522/161

(58) Field of Search ............... 522/62, 65, 83, 522/110, 112, 114, 117, 121, 157, 161; 521/94, 142, 143

(56) References Cited

U.S. PATENT DOCUMENTS

| 4,186,068 A | 1/1980 | Rubens |
| 4,203,815 A | 5/1980 | Noda et al. |

FOREIGN PATENT DOCUMENTS

| DD | 222824 | 5/1985 |

*Primary Examiner*—Morton Foelak
(74) *Attorney, Agent, or Firm*—Millen, White, Zelano & Branigan, P.C.

(57) ABSTRACT

The invention relates to a process for producing foamed polyolefin-based plastics blocks by first crosslinking a matrix comprising a) from 51 to 97% by weight of one or more polyolefins, selected from the group consisting of polyethylene and ethylene copolymer, b) from 3 to 20% by weight of a foaming agent, using β-radiation of energy >6 MeV. The thickness of the matrix is from 25 to 45 mm. The radiation dose is from 20 to 150 kJ/kg. During the irradiation, atmospheric oxygen is at least substantially prevented from reaching the surface of the matrix. After crosslinking, the crosslinked matrix is foamed by heating to a temperature >160° C. and decomposing the blowing agent.

15 Claims, No Drawings

METHOD FOR PRODUCING FOAMED PLASTIC BLOCKS BASED ON POLYOLEFIN

TECHNICAL FIELD

The invention relates to a process for producing foamed polyolefin-based plastics blocks, in particular based on crosslinked polyethylene.

The production of crosslinked polyethylene foams generally starts from what is known as a matrix, a compact plastics sheet or plastics web, which comprises the foaming agent and, where appropriate, a crosslinking agent in finely divided form, but has not yet been foamed. The matrix is generally extruded at a temperature which must be below the decomposition or reaction temperature of the crosslinking agent and foaming agent.

In the crosslinking, a distinction is made between
physical crosslinking by means of high-energy radiation, such as β- or γ-radiation
chemical crosslinking, e.g. by means of organic peroxides, which when a particular temperature is exceeded bring about crosslinking of the plastics.

In relation to the foaming, a distinction is made between
continuous foaming of a web product made from a continuous matrix whose thickness is up to about 5 mm, and
what is known as the block foaming process: batch foaming of relatively large sheets of matrix.

Whereas foam blocks produced by the block foaming process and continuously produced web product with physical crosslinking have very fine cells, continuous production of chemically crosslinked foams gives a rather coarser cell structure. Examples of typical cell sizes are from 0.1 to 0.2 mm for chemically crosslinked block foam, from 0.6 to 0.8 mm for chemically crosslinked foam from continuous foaming, and from 0.3 to 0.4 mm for physically crosslinked foam from continuous foaming.

PRIOR ART

A process for the continuous production of chemically crosslinked polyolefin-based foam webs is described by way of example in DE 16 94 130 C3, while the block foaming process with chemical crosslinking is known by way of example from DE 34 30 108 C2 and EP 0 186 110 B1. Finally, U.S. Pat. No. 3,562,367 A relates to a process for the continuous production of physically crosslinked foam webs by using electron beams (β-radiation) for crosslinking.

Whereas the production of continuous polyethylene-based foam webs with either physical crosslinking or else with chemical crosslinking is widely practiced, only one chemical crosslinking method for producing block foam has been disclosed hitherto.

The crosslinking agent generally used is dicumyl peroxide. Since dicumyl peroxide is not without some physiological risk, precautionary reasons prevent the use of any relatively large amounts of dicumyl peroxide for crosslinking foams for products related to food or drink.

OBJECT

It was therefore an object of the present invention to provide a process which can produce crosslinked block foam based on polyolefins, in particular polyethylene, and which gives fine-celled foams while using no, or only very little, dicumyl peroxide.

EXPOSITION OF THE INVENTION

The invention achieves this object by means of a process according to Claim 1, preferably in combination with one or more of the features of the subclaims.

A substantive feature here is the use of β-radiation, i.e. of electron beams, where the energy of the electrons is >6 MeV, and where the thickness of the matrix is from 25 to 45 mm. It has been found that if electron beams of <6 MeV are used the crosslinking of the matrix is inhomogeneous, giving the foam non-uniform quality and non-uniform physical properties.

Preference is given to β-radiation whose energy is from 8 to 15 MeV, and the thickness of the matrix here is preferably from 30 to 40 mm.

The radiation dose is from 20 to 150 kJ/kg [= from 20 to 150 kGy], preferably from 40 to 70 kJ/kg. If the radiation dose is below 20 kJ/kg, the crosslinking of the matrix is inadequate, while if the dose is above 150 kJ/kg the crosslinking is excessive and impedes the foaming process.

The radiation dose can be set within the lower range from 20 to 80 kJ/kg by adding amounts of from 0.05 to 2% by weight, based on the matrix, of crosslinking aids, such as trimethylpropane trimethacrylate [sic], diallyl phthalate, allyl methacrylate or triallyl cyanurate, whereas if the material used has no crosslinking aids or crosslinking accelerators a somewhat higher β-radiation dose is needed.

Using the high radiation dose according to the invention with very high-energy electrons leads to marked heating of the matrix through the irradiation. It is therefore preferable to carry out the crosslinking in a number of β-radiation passes, with in each case a partial dose of from 10 to 50 kJ/kg. Between each two passes, it is preferable for the matrix to be cooled. When crosslinking in a number of passes it is particularly preferable for irradiation from the upper side to alternate with irradiation from the other side. This achieves uniform crosslinking of the matrix.

In another preferred embodiment of the invention for high radiation doses, the temperature in the matrix is controlled by adapting the level of the partial dose in an individual irradiation pass in such a way that the temperature of the matrix never exceeds 70° C., the maximum temperature preferably being not more than 50° C.

The use of high-energy electron beams causes a chemical alteration at the surface of the matrix, in particular an oxidation process, which causes skinning and surface cracking during subsequent foaming of the matrix. According to the invention, therefore, atmospheric oxygen is at least substantially prevented from reaching the matrix. This is preferably achieved by applying a paste or high-viscosity composition, for example a wax or the like. In an alternative preferred embodiment of the invention, an envelope made from a film of, for example, polyethylene at least substantially prevents atmospheric oxygen from reaching the matrix during the irradiation.

The thermoplastic used is a polyolefin composed at least predominantly of polyethylene and/or of ethylene copolymer. Particular preference is given here to LDPE, HDPE, LLDPE, VLDPE, a mixture of these polyethylene types, or a mixture of one or more of these polyethylene types with EVA and/or EPM or EPDM.

In another preferred embodiment of the invention, the matrix also comprises from 0.05 to 5% by weight of zinc oxide to lower the decomposition temperature of the blowing agent.

In another embodiment of the invention, the matrix preferably comprises from 0.05 to 1% by weight of fine-particle magnesium hydroxide. This reduces the cell size of the cells in the foam.

It has been found that the quality of the resultant foam is particularly good if a waiting time of at least 24 h is maintained between crosslinking by electron beam and foaming.

The invention is suitable for producing foam blocks whose average density is from 20 to 180 kg/m$^2$ [sic], preferred densities being from 30 to 130 kg/m$^2$ [sic].

The preferred foaming agent or blowing agent used is azodicarbonamide—as in the prior art. The foaming itself takes place in a manner known per se in enclosed, heated molds, the size of the mold being greater than the matrix by the desired foaming factor.

METHOD OF CARRYING OUT THE INVENTION

To produce a foam block of dimensions 100 cm×200 cm×10 cm, envelope density about 45 kg/cm³ [sic], the following mix is homogenized in a single-screw extruder, and extruded to give a matrix whose thickness is 3.5 cm and whose width is 35 cm:

| | |
|---|---|
| LDPE | 100 parts by weight |
| Azodicarbonamide | 17 parts by weight |
| Zinc oxide | 1 part by weight |
| Color pigment | 1.5 parts by weight |

During the extrusion, care must be taken that the max. temperature does not exceed 140° C., in order to prevent premature reaction of the azodicarbonamide (blowing agent). A section of this matrix, 70 cm in length, is cooled and then welded into an airtight envelope of commercially available PE film, the thickness of the PE film being about 50 µm. During the welding, a vacuum is used to remove the residual air from the pack.

The matrix prepared in this way is irradiated in an electron beam system with β-radiation, the energy of the electrons being 10 MeV, irradiating from the upper side in a first pass where the absorbed radiation dose is 15 kJ/kg. During the first irradiation the matrix becomes heated to 28° C. After a holding time of 20 min. the second side of the matrix is irradiated with the same partial dose. A further holding time of 20 min. is followed by irradiation of the first side again, and then of the second side again, in each case with a partial dose of 15 kJ/kg, the total dose therefore being 60 kJ/kg.

The irradiation crosslinks the matrix material. After a holding time of 48 h, the crosslinked matrix is preheated for 4 h at 160° C. in a circulating oven. The preheated matrix is then placed in a foaming mold whose internal dimension corresponds to the desired dimensions of the foam block: 1 m×2 m×10 cm. The wall temperature of the foaming mold has been raised to about 170° C. At this temperature the exothermic decomposition of the azodicarbonamide is initiated. After about 1 h, the block has been completely foamed and the mold entirely filled. After cooling in the closed mold to about 80° C., the block can be demolded and further cooled in free contact with the atmosphere.

the resultant physically crosslinked block foam had a very fine cell structure and good physical properties.

What is claimed is:

1. Process for producing foamed polyolefin-based plastics blocks by
    crosslinking a matrix comprising
        a) from 51 to 97% by weight of one or more polyolefins, selected from the group consisting of polyethylene and ethylene copolymer,
        b) from 3 to 20% by weight of a foaming agent, using β-radiation of energy >6 MeV, where
            the thickness of the matrix is from 25 to 45 mm,
            the radiation dose is from 20 to 150 kJ/kg, and
            during the irradiation, atmospheric oxygen is at least substantially prevented from reaching the surface of the matrix,
    foaming the crosslinked matrix by heating to a temperature >160° C. and decomposing the blowing agent.

2. Process according to claim 1, characterized in that the radiation dose is from 40 to 70 kJ/kg.

3. Process according to claim 1, characterized in that the crosslinking takes place in a number of β-radiation passes, with in each case a partial dose of from 10 to 50 kJ/kg.

4. Process according to claim 1, characterized in that the crosslinking takes place in a number of β-radiation passes, where the temperature in the matrix reaches in each case not more than 70° C.

5. Process according to claim 1, characterized in that during the irradiation an envelope made from a polyethylene film at least substantially prevents atmospheric oxygen from reaching the surface of the matrix.

6. Process according to claim 1, characterized in that during the irradiation a protective layer made from a paste or high-viscosity composition at least substantially prevents atmospheric oxygen from reaching the surface of the matrix.

7. Process according to claim 1, characterized in that the polyethylene or ethylene copolymer used comprises an LDPE, HDPE, LLDPE, VLDPE, a mixture of these polyethylene types, or a mixture of one or more of these polyethylene types with EVA and/or EPM and/or EPDM.

8. Process according to claim 1, characterized in that the matrix also comprises from 0.05 to 2% by weight of a crosslinking aid or crosslinking accelerator.

9. Process according to claim 8, characterized in that the crosslinking aid used comprises one or more crosslinking aids selected from the group consisting of trimethylpropane trimethacrylate, diallyl phthalate, allyl methacrylate and triallyl cyanurate.

10. Process according to claim 1, characterized in that the matrix also comprises from 0.05 to 5% by weight of zinc oxide.

11. Process according to claim 1, characterized in that the matrix also comprises from 0.05 to 1% by weight of fine-particle magnesium hydroxide.

12. Process according to claim 1, characterized in that a waiting time >24 h is maintained between irradiation and foaming.

13. Process according to claims 1, characterized in that the foaming gives a foam block whose average density is from 20 to 180 kg/m³.

14. A process according to claim 4, wherein the temperature during irradation is not more than 50° C.

15. A process according to claim 13, wherein the average density is from 30 to 120 kg/m³.

* * * * *